United States Patent Office 2,894,007
Patented July 7, 1959

2,894,007

PROCESS FOR PREPARING 9α-FLUORO STEROIDS

Robert P. Graber, Elizabeth, and C. Stewart Snoddy, Jr., Plainfield, N.J., assignors to Merck & Co., Inc., Rahway, N.J., a corporation of New Jersey No Drawing. Application February 3, 1955
Serial No. 486,022

4 Claims. (Cl. 260—397.45)

This invention relates to an improved process for preparing 9α-fluoro-steroids.

One general method applicable for the synthesis of 9α-fluoro-4-pregnene-11β,17α,21-triol-3,20-dione 21-acetate is the reported procedure in J.A.C.S. vol. 76, pages 1455–6 (1954). In this procedure, disclosed by Fried et al., a solution of 9β,11β-oxido-4-pregnene-17α,21-diol-3,20-dione 21-acetate in anhydrous chloroform free of ethanol is treated with anhydrous hydrogen fluoride under anhydrous conditions to obtain 9α-fluoro-4-pregnene-11β,17α,21-triol-3,20-dione 21-acetate in about 50% yield. This reaction can be chemically represented, as follows:

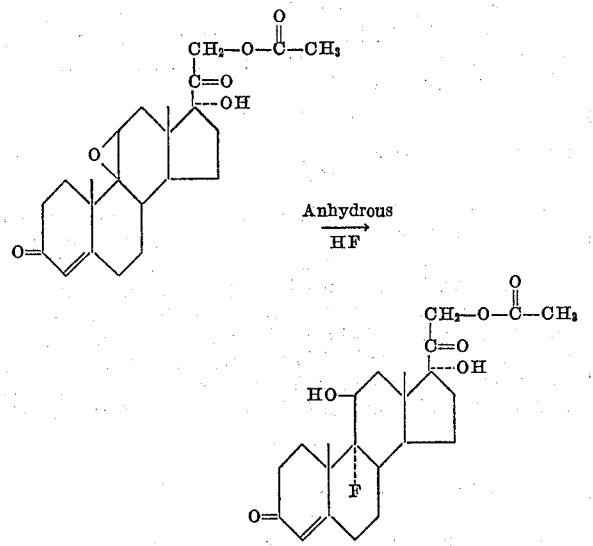

One of the primary disadvantages of this method is that it is carried out under anhydrous conditions which are objectionable in commercial manufacturing operations. Moreover the handling of large amounts of anhydrous hydrogen fluoride is extremely hazardous and difficult, and especially so when used industrially. The reaction requires the strict control of the concentration of hydrogen fluoride which necessitates laborious and hazardous titrations. In addition the preparation and storage of alcohol-free chloroform is difficult and undesirable. In view of these difficulties, the Fried et al. method is looked on as a laboratory procedure and not as a process adaptable to commercial operations.

An object of the invention is to provide a process for producing 9α-fluoro-steroids. Another object is to provide a simplified process for producing 9α-fluoro-4-pregnene-11β,17α,21-triol-3,20-dione 21-acetate which is readily adaptable to commercial utilization. A further object is to provide such a process without effecting the overall yield of the desired product. Other objects and the advantages of the invention will appear hereinafter.

In accordance with the invention it has now been discovered that hydrogen fluoride can be reacted with a 9β,11β-oxido steroid in aqueous media to produce the corresponding 9α-fluoro steroid. Surprisingly enough, this modification of the heretofore used process results in the formation of the desired 9α-fluoro steroids in a yield equal to that obtained according to the prior art anhydrous method.

In one embodiment of the invention the aqueous process is carried out in the presence of an inert non-oxidizing strong acid to increase the rate of reaction. By inert non-oxidizing strong acid is meant an acid which does not react with the starting material and is non-oxidizing under the condition of the reaction. The preferred acids are 2,4-dinitrobenzene sulfonic acid and perchloric acid. Other acids can be used, however, of which sulfuric acid, methanesulfonic acid, ethanesulfonic acid, n-propane-1-sulfonic acid, n-butane-1-sulfonic acid, n-pentane-1-sulfonic, n-hexane-1-sulfonic acid, p-nitrobenzenesulfonic acid, and trichloroacetic acid are typical examples. The acid is preferably present in about one-half to thirty moles per mole of the steroid.

As a starting material in the improved process any of the 9β,11β-oxido steroids may be utilized. The 9β,11β-oxido pregnanes, pregnenes, and androstanes and androstenes are particularly suitable for conversion in this process. Varied substituents can be present in the molecule, such as keto groups at the 3 and/or 20 positions; hydroxy groups at the 3, 4, 6, 12, 17, and/or 21 positions; and ester groups in the 3, 4, 6, 12, 17, and/or 21 positions. The ester groups are preferably derived from organic carbocyclic acids, especially such acids containing from one to eight carbon atoms inclusive. Among such acids are formic, propionic, butyric, valeric, hexanoic, heptanoic, octanoic, tertiary butylacetic, cyclopentane carboxylic acid, cyclohexane carboxylic acid, benzoic, toluic, phenylacetic, cyclo-pentylpropionic and the like. Typical examples of suitable 9β,11β-oxido steroids are—

9β,11β-oxido-4-pregnene-17α-ol-3-one
9β,11β-oxido-4-pregnene-21-ol-3-one
9β,11β-oxido-4-pregnene-17α,20α,21-triol-3-one
9β,11β-oxido-4-pregnene-17α,20β,21-triol-3-one
9β,11β-oxido-4-pregnene-17α-ol-3,20-dione
9β,11β-oxido-4-pregnene-21-ol-3,20-dione
9β,11β-oxido-4-pregnene-17α,21-diol-3,20-dione
9β,11β-oxido-4-pregnene-17α,21-diol-3,20-dione 21-acetate
9β,11β-oxido-4-pregnene-17α,21-diol-3,20-dione 21-propionate
9β,11β-oxido-4-pregnene-17α,21-diol-3,20-dione 21-formate
9β,11β-oxido-4-pregnene-17α,21-diol-3,20-dione 21-butyrate
9β,11β-oxido-4-pregnene-17α,21-diol-3,20-dione 21-benzoate
9β,11β-oxido-4-pregnene-17α,21-diol-3,20-dione 21-t-butylacetate
9β,11β-oxido-4-pregnene-17α,21-diol-3,20-dione 21-hemisuccinate
9β,11β-oxido-4-pregnene-17α,21-diol-3,20-dione 21-phenylacetate
9β,11β-oxido-4-pregnene 3,6-dione
9β,11β-oxido-4-pregnene 3,6,20-trione
9β,11β-oxido-4-pregnene 17α-ol-3,6,20-trione
9β,11β-oxido-4-pregnene 17α,21-diol-3,6,20-trione
9β,11β-oxido-4-pregnene 21-ol-3,6,20-trione
9β,11β-oxido-4-pregnene 6α-ol-3,20-dione
9β,11β-oxido-4-pregnene 6β-ol-3,20-dione
9β,11β-oxido-4-pregnene 4-ol-3,20-dione
9β,11β-oxido-4-pregnene 4,17α-diol-3,20-dione
9β,11β-oxido-4-pregnene 4,17α,21-triol-3,20 dione
9β,11β-oxido-4-pregnene 17α,21-diol-3,6,20-trione 21-acetate
9β,11β-oxido-4-pregnene 6α-ol-3,20-dione 6α-acetate 9β,11β-oxido-4-pregnene 4,17α,21-triol-3,20-dione 4,21-diacetate
9β,11β-oxido pregnane-17α,21-diol-3,20-dione 21-acetate
9β,11β-oxido pregnane 17α-ol-3,20-dione
9β,11β-oxido pregnane 21-ol-3,20-dione
9β,11β-oxido pregnane 21-ol-3,20-dione 21-acetate
9β,11β-oxido pregnane 17α,21-diol-3,20-dione
9β,11β-oxido androstane-3,17-dione
9β,11β-oxido androstane-17-ol-3-one
9β,11β-oxido-4-androstene-3,17-dione
9β,11β-oxido-4-androstene-17-ol-3-one The reaction can be carried out in a two-phase system, i.e. when the organic solvent is a water-immiscible solvent such as chloroform or in a one-phase system, i.e. when the organic solvent is a water-miscible solvent such as tetrahydrofuran. Other water-immiscible solvent media can be used, such as ethylene dichloride, carbon tetrachloride and methylene chloride. Other water miscible solvents can be used such as dioxane, propionic acid, butyric acid and acetic acid or the like which are inert to the reactants. The reaction temperature is preferably about 0° C., but a wide range of temperatures can be used such as from −30° C. to +60° C. At a temperature of approximately 0° C. the reaction requires from one-quarter to four hours for completion. The conditions will, of course, vary depending on the particular reactants. The hydrogen fluoride is preferably used in excess of the theoretical amount required and usually at least about fifty to three hundred times the theoretical amount.

The 9α-fluoro steroid may be conveniently recovered by diluting the reaction mixture with water, extracting with an organic solvent such as chloroform, followed by crystallization of the isolated organic material from organic solvents such as benzene, acetone, mixtures of benzene-chloroform, acetone-petroleum ether, acetone-ether, and ethylacetate ether. Another suitable method is by acylating the crude reaction product and either recovering the product by recrystallization from a solvent, such as a chloroform and benzene mixture or subjecting the acylated mixture to a chromatographic separation on neutral absorbents such as neutral alumina, Florisil (an adsorbent prepared according to U.S. Patent No. 2,393,625), and activated carbon.

The following examples are given for the purpose of illustration:

EXAMPLE 1

*9α - fluoro - 4 - pregnene - 11β,17α,21 - triol - 3,20 - dione 21 - acetate*

A one millimole (0.402 g.) sample of 9β,11β-oxido-4-pregnene-17α,21-diol-3,20-dione 21-acetate in 10 ml. of chloroform at approximately 0° to 5° C. is treated with a mixture of 5 ml. of a 52–55% solution of hydrogen fluoride (130 millimoles) and 5 ml. of 60% perchloric acid (30 millimoles) at 0–5° C. The reaction mixture is stirred and the temperature maintained at 0° C. for a period of 15 minutes. At the end of this time 50 ml. of water is added and the organic material extracted with several portions of chloroform. The combined chloroform extracts are washed with water until neutral, filtered through anhydrous magnesium sulfate, and the solvent removed in vacuo to afford the crude reaction mixture containing the desired 9α-fluoro-4-pregnene-11β,17α,21-triol-3,20-dione 21-acetate.

EXAMPLE 2

*9α - fluoro - 4 - pregnene - 11β,17α, 21 - triol - 3,20 - dione 21 - acetate*

A one millimole sample of 9β,11β-oxido-4-pregnene-17α,21-diol-3,20-dione 21-acetate in 10 ml. of chloroform at approximately 0° to 5° C. is treated with a mixture of 9 ml. of a 52–55% solution of hydrogen fluoride (234 millimoles) and one ml. of 60% perchloric acid (6 millimoles) at 0–5° C. The reaction is worked up as described in Example 1. On the basis of paper strip chromatographic analysis of the product, it contains an estimated ca. 55% of the desired compound.

EXAMPLE 3

*9α - fluoro - 4 - pregnene - 11β,17α,21 - triol - 3,20 - dione 21 - acetate*

A one millimole sample of 9β,11β-oxido-4-pregnene-17α,21-diol-3,20-dione 21-acetate in 10 ml. of chloroform at approximately 0 to 5° C. is treated with a mixture of 9.5 ml. of a 52–55% solution of hydrogen fluoride (247 millimoles) and 0.5 ml. of 60% perchloric acid (3 millimoles) at 0–5° C. The reaction mixture is stirred and the temperature is maintained at 0° C. for a period of 15 minutes. The reaction is worked up as described in Example 1. On the basis of paper strip chromatographic analysis of the product, it contains an estimated ca. 60% of the desired compound.

EXAMPLE 4

*9α - fluoro - 4 - pregnene - 11β,17α,21 - triol - 3,20 - dione 21 - acetate*

A one millimole sample of 9β,11β-oxido-4-pregnene-17α,21-diol-3,20-dione 21-acetate in 10 ml. of chloroform at approximately 0 to 5° C. is treated with a mixture of 9.75 ml. of a 52–55% solution of hydrogen fluoride (253 millimoles) and 0.25 ml. of 60% perchloric acid (1.5 millimoles) at 0–5° C. The reaction mixture is stirred and the temperature is maintained at 0° C. for a period of 15 minutes. The reaction is worked up as described in Example 1. On the basis of paper strip chromatographic analysis of the product, it contains an estimated ca. 60% of the desired compound.

EXAMPLE 5

*9α - fluoro - 4 - pregnene - 11β,17α,21 - triol - 3,20 - dione 21 - acetate*

A 0.5 millimole sample of 9β,11β-oxido-4-pregnene-17α,21-diol-3,20-dione 21-acetate in 5 ml. of chloroform at 0–5° C. is treated with 5 ml. of a 52–55% solution of hydrogen fluoride at approximately 0 to 5° C. The mixture is stirred and the temperature is allowed to rise to and maintained at 25–30° C. for one hour. The reaction is worked up as described in Example 1. On the basis of paper strip chromatographic analysis of the product, it contains an estimated ca. 65% of the desired compound.

EXAMPLE 6

*9α - fluoro - 4 - pregnene - 11β,17α,21 - triol - 3,20 - dione 21 - acetate*

A one millimole sample of 9β,11β-oxido-4-pregnene-17α,21-diol-3,20-dione 21-acetate in 10 ml. of chloroform at approximately 0 to 5° C. is treated with a mixture of 9.0 ml. of a 52–55% solution of hydrogen fluoride and 1.81 grams of 2,4-dinitrobenzene sulfonic acid trihydrate (6 millimoles) at 0–5° C. The reaction mixture is stirred and the temperature is maintained at 0° C. for a period of 15 minutes. The reaction is worked up as described in Example 1. On the basis of paper strip chromatographic analysis of the product, it contains an estimated ca. 65% of the desired compound.

EXAMPLE 7

*9α-fluoro-4-pregnene-11β,17α,21-triol-3,20-dione 21-acetate*

A one millimole sample of 9β,11β-oxido-4-pregnene-17α,21-diol-3,20-dione 21-acetate in 30 ml. of tetrahydrofuran at approximately 0 to 5° C. is treated with a mixture of 28 ml. of a 52–55% solution of hydrogen fluoride and 2 ml. of 60% perchloric acid at 0–5° C. The reaction mixture is stirred and the temperature is maintained at 0° C. for a period of 15 minutes. The reaction is worked up as described in Example 1. On the basis of paper strip chromatographic analysis of the product, it contains an estimated ca. 55% of the desired compound.

EXAMPLE 8

*9α-fluoro-4-pregnene-11β,17α,21-triol-3,20-dione 21-acetate*

A 0.50 millimole sample of 9β,11β-oxido-4-pregnene-17α,21-diol-3,20-dione 21-acetate in 15 ml. of tetrahydrofuran is treated with 15 ml. of a 52–55% solution of hydrogen fluoride. The reaction mixture is stirred and maintained at 25–30° C. for 30 minutes. The reaction mixture is worked up as described in Example 1. Paper strip chromatographic analysis of the product indicates that it contains an estimated ca. 65% of the desired compound.

EXAMPLE 9

*9α-fluoro-4-pregnene-11β,17α,21-triol-3,20-dione 21-acetate*

A 25.0 millimole sample of 9β,11β-oxido-4-pregnene-17α,21-diol-3,20-dione 21-acetate in 250 ml. of chloroform at 0–5° C. is treated with a mixture of 237.5 ml. of a 52–55% solution of hydrogen fluoride and 12.5 ml. of 60% perchloric acid at 0 to 5° C. The reaction mixture is stirred and the temperature is maintained at 0° C. for a period of 15 minutes. The reaction is worked up as described in Example 1. On the basis of paper strip chromatographic analysis of the product it contains an estimated ca. 55% of the desired compound.

This product is acetylated by treating with 27 ml. of pyridine and 27 ml. of acetic anhydride at 60–65° C. for one hour and five minutes. The excess pyridine and acetic anhydride are removed in vacuo and the residue dissolved in 100 ml. of chloroform. This solution is washed with water, with 2.5 N aqueous hydrochloric acid until the washings are acidic, again with water, then with 5% aqueous sodium bicarbonate until the washings are basic, then with water. After filtration of the washed chloroform solution through anhydrous magnesium sulfate, the solvent is removed in vacuo to afford 11.13 g. of crude product. This material is chromatographed over neutral alumina and the portions shown to be the desired product by paper strip analysis are combined, weight=4.81 g. of substantially pure 9α-fluoro-4-pregnene-11β,17α,21-triol-3,20-dione 21-acetate.

EXAMPLE 10

*9α-fluoro-4-pregnene-11β,17α,21-triol-3,20-dione 21-acetate*

A 12.5 millimole sample of 9β,11β-oxido-4-pregnene-17α,21-diol-3,20-dione 21-acetate in 125 ml. of chloroform at approximately 0 to 5° C. is treated with a mixture of 118.75 ml. of a 52–55% solution of hydrogen fluoride and 6.25 ml. of 60% perchloric acid at 0–5° C. The reaction mixture is stirred and the temperature is maintained at 0° C. for a period of 15 minutes. The reaction is worked up as described in Example 1. On the basis of paper strip chromatographic analysis of the product it contains an estimated ca. 65% of the desired compound.

The crude product is treated with acetic anhydride and pyridine as described in Example 9. After removal of the excess acylating agent in vacuo, the residue is crystallized twice from acetone-petroleum ether (B.P. 60–70° C.) to afford 2.08 g. of substantially pure 9α-fluoro-4-pregnene-11β,17α,21-triol-3,20-dione 21-acetate.

EXAMPLE 11

*9α-fluoro-4-pregnene-11β,17α,21-triol-3,20-dione 21-acetate*

A 12.5 millimole sample of 9β,11β-oxido-4-pregnene-17α,21-diol-3,20-dione 21-acetate in 125 ml. of ice-cold chloroform is treated with an ice-cold mixture of 118.75 ml. of a 52–55% solution of hydrogen fluoride and 6.25 ml. of 60% perchloric acid. The reaction mixture is stirred and the temperature maintained at 0° C. for 25 minutes. The reaction is worked up as described in Example 1. Paper strip chromatographic analysis of the product indicates that it contains ca. 60% of the desired compound.

The crude product is acetylated as described in Example 9. This crude product is crystallized once from chloroform-benzene and once from acetone-petroleum ether (B.P. 60–70° C.) to give 1.645 g. of substantially pure 9α-fluoro-4-pregnene-11β,17α,21-triol-3,20-dione 21-acetate.

EXAMPLE 12

*9α-fluoro-4-pregnene-11β,17α,21-triol-3,20-dione 21-acetate*

A 20.0 millimole sample of 9β,11β-oxido-4-pregnene-17α,21-diol-3,20-dione 21-acetate in 200 ml. of ice-cold chloroform is treated with an ice-cold mixture of 195 ml. of a 52–55% solution of hydrogen fluoride and 5 ml. of 60% perchloric acid. The reaction mixture is stirred and the temperature maintained at 0° C. for 25 minutes. The reaction mixture is worked up as described in Example 1. Paper strip chromatographic analysis of the product indicates that it contains ca. 60% of the desired compound.

The crude product is acetylated as described in Example 9. This crude product is crystallized once from chloroform-benzene to give 3.69 g. of substantially pure 9α-fluoro-4-pregnene-11β,17α,21-triol-3,20-dione 21-acetate as the ½ mole benzene solvate.

EXAMPLE 13

*9α-fluoro-4-pregnene-11β,17α,21-triol-3,20-dione 21-acetate*

A 10.0 millimole sample of 9β,11β-oxido-4-pregnene-17α,21-diol-3,20-dione 21-acetate in 300 ml. of ice-cold tetrahydrofuran is treated with an ice-cold mixture of 295 ml. of a 52–55% solution of hydrogen fluoride and 5.0 ml. of 60% perchloric acid. The reaction mixture is stirred and the temperature maintained at 0° C. for 45 minutes. The reaction mixture is worked up as described in Example 1. Paper strip chromatographic analysis of the product indicates that it contains ca. 65% of the desired compound.

The crude product is acetylated as described in Example 9. This crude acetylated product is crystallized once from chloroform-benzene and once from acetone-petroleum ether (B.P. 60–70° C.) to afford 1.71 g. of substantially pure 9α-fluoro-4-pregnene-11β, 17α,21-triol-3,20-dione 21-acetate.

EXAMPLE 14

*9α-fluoro-4-pregnene-11β,17α,21-triol-3,20-dione 21-acetate*

A 2.5 millimole sample of 9β,11β-oxido-4-pregnene-17α,21-diol-3,20-dione 21-acetate dissolved in 25 ml. of glacial acetic acid is treated with 25 ml. of 52–55% aqueous hydrofluoric acid and the resulting solution allowed to stand at 25–30° C. for 30 minutes. The orange-yellow solution is then poured into 100 ml. of ice water and stored at 0 to 5° C. for one hour. The yellow crystalline product is filtered, washed with water, and dried to yield 0.54 g. of crude 9α-fluorohydrocortisone acetate, M.P. 210–223° C. Recrystallization from acetone gave product melting at 224–229° C. which is identical by mixed melting point and infrared analysis to authentic material.

EXAMPLE 15

*9α-fluoro-4-pregnene-11β,17α,21-triol-3,20-dione 21-acetate*

A 10.0 millimole sample of 9β,11β-oxido-4-pregnene-17α,21-diol-3,20-dione in 100 ml. of ice-cold chloroform is treated with an ice-cold mixture of 90 ml. of a 52–55% solution of hydrogen fluoride and 10 ml. of 60% perchloric acid. The reaction mixture is stirred and the temperature is maintained at 0° C. for 15 minutes. The reaction is worked up as described in Example 1. The crude product is acetylated as described in Example 9. This crude acetylated product is crystallized from chloroform-benzene to afford 1.59 g. of substantially pure 9α-fluoro-4-pregnene-11β,17α,21-triol-3,20-dione 21 - acetate as the ½ mole benzene solvate.

EXAMPLE 16

*9α-fluoro-4-pregnene-11β,21-diol-3,20-dione 21-acetate*

A 1.15 g. sample of 9β,11β-oxido-4-pregnene-21-ol-3,20-dione 21-acetate in 30 ml. of chloroform at 0 to 5° C. is treated with a mixture of 29.3 ml. of a 52–55% solution of hydrogen fluoride and 0.75 ml. of 60% perchloric acid at 0 to 5° C. The reaction mixture is stirred and the temperature maintained at 0° C. for a period of 25 minutes. The reaction is worked up as described in Example 1. Crystallization of the crude product from acetone-petroleum ether (B.P. 60–70° C.) afforded substantially pure 9α-fluoro-4-pregnene-11β,21-diol-3,20-dione 21-acetate.

EXAMPLE 17

*9α-fluoro-4-pregnene-11β,17α-diol-3,20-dione*

A 3.445 g. sample of 9β,11β-oxido-4-pregnene-17α-ol-3,20-dione in 300 ml. of tetrahydrofuran at 0–5° C. is treated with 300 ml. of a 52–55% solution of hydrogen fluoride at 0 to 5° C. The reaction mixture is stirred, allowed to warm to room temperature and the temperature maintained at 25–30° C. for one half hour. The reaction is worked up as described in Example 1. The crude product is treated with acetic anhydride and pyridine as described in Example 9. This crude acetylated product is chromatographed over 148 g. of neutral alumina and the portions shown to contain the desired 9α-fluoro-4-pregnene-11β,17α - diol - 3,20 - dione by paper chromatographic analysis are combined. Recrystallization from acetone affords the substantially pure product.

What is claimed is:

1. In the process wherein hydrogen fluoride is reacted with a 9β,11β-oxido-steroid to produce the corresponding 9α-fluoro-11β-hydroxy-steroid, the improvement which comprises carrying out the reaction in an aqueous solvent medium and in the presence of a non-oxidizing acid selected from the group consisting of perchloric acid, sulfuric acid, trichloroacetic acid, the lower alkanesulfonic acids p-nitrobenzenesulfonic acid and 2-4 dinitrobenzenesulfonic acid.

2. In the process wherein hydrogen fluoride is reacted with a 9β,11β-oxido-4-pregnene compound to produce the corresponding 9α-fluoro-11β-hydroxy-4-pregnene, the improvement which comprises carrying out the reaction in an aqueous solvent medium in the presence of perchloric acid.

3. In the process wherein hydrogen fluoride is reacted with a 9β,11β-oxido-4-pregnene compound to produce the corresponding 9α-fluoro-11β-hydroxy-4-pregnene, the improvement which comprises carrying out the reaction in an aqueous solvent medium in the presence of 2,4-dinitrobenzene sulfonic acid.

4. A process which comprises reacting 9β,11β-oxido-4-pregnene-17α,21-diol-3,20-dione 21-acetate with aqueous hydrogen fluoride at approximately 0° to 5° C. in the presence of a mixture of chloroform and perchloric acid to produce 9α-fluoro-4-pregnene - 11β,17α,21 - triol - 3,20-dione 21-acetate.

References Cited in the file of this patent

Fried: Jour. Am. Chem. Soc. 75, 2273–74 (1953).
Fried: Jour. Am. Chem. Soc. 76, 1455 (1954).